US007474202B2

(12) United States Patent
Rose et al.

(10) Patent No.: US 7,474,202 B2
(45) Date of Patent: Jan. 6, 2009

(54) BUS SAFETY CONTROLLER METHOD AND SYSTEM

(75) Inventors: Dean E. Rose, Sunbury, OH (US); Joseph E. Dryer, Houston, TX (US)

(73) Assignee: Transportation Safety Products, Ltd., Worthington, OH (US)

( * ) Notice: Subject to any disclaimer, the term of this patent is extended or adjusted under 35 U.S.C. 154(b) by 270 days.

(21) Appl. No.: 11/473,606

(22) Filed: Jun. 23, 2006

(65) Prior Publication Data

US 2007/0132561 A1 Jun. 14, 2007

Related U.S. Application Data

(60) Provisional application No. 60/749,822, filed on Dec. 13, 2005.

(51) Int. Cl.
*B60Q 1/26* (2006.01)

(52) U.S. Cl. ....................... 340/433; 340/996; 340/463; 381/82

(58) Field of Classification Search ................. 340/433, 340/994, 457, 463; 381/82, 86; 701/213, 701/117
See application file for complete search history.

(56) References Cited

U.S. PATENT DOCUMENTS

| | | | | |
|---|---|---|---|---|
| 3,838,392 | A | 9/1974 | Lockwood et al. | |
| 5,293,151 | A * | 3/1994 | Rose | 340/433 |
| 5,467,071 | A | 11/1995 | Koenig | |
| 5,493,269 | A | 2/1996 | Durkey et al. | |
| 5,963,151 | A * | 10/1999 | Hubbard | 340/996 |
| 6,522,754 | B1 * | 2/2003 | Long et al. | 381/82 |
| 6,580,362 | B1 * | 6/2003 | Zimmerman et al. | 340/425.5 |
| 6,661,349 | B1 * | 12/2003 | Kuruvilla et al. | 340/691.6 |
| 6,915,209 | B1 * | 7/2005 | Spann | 701/213 |
| 6,989,740 | B2 | 1/2006 | Tabe | |
| 2003/0194096 | A1 * | 10/2003 | Kennedy et al. | 381/82 |

OTHER PUBLICATIONS

National Geographic Magazine, Mar. 2005, pp. 6-13, See particularly pp. 12 and 13.

Gogtay, et al., "Dynamic mapping of human cortical development during childhood through early adulthood", Proc. Natl. Acad. Sci. USA, vol. 101, No. 21, pp. 8178-8179 (2004).

"Lack of brain maturity may explain teen crash rate", the Washington Post, Feb. 1, 2005.

Double "D" Technologies Electrical Schematic Title V_ALARM2, Dated Dec. 6, 2000.

* cited by examiner

*Primary Examiner*—George A Bugg
*Assistant Examiner*—Hoi C Lau
(74) *Attorney, Agent, or Firm*—Mueller Smith

(57) ABSTRACT

System and method for automatically broadcasting voice-based prompt warnings toward an embarkation and/or disembarkation location at which passengers such as students and others may or will be present. The method is multi-model providing voice messages during an approach mode, a stop mode and a standby mode. Recorded human voice messages are employed for the prompt and are the recorded voices of one or more people having voice characteristics generally recognizable by the passengers to an extent effective to supplement the function of the immature prefrontal cortex.

22 Claims, 10 Drawing Sheets

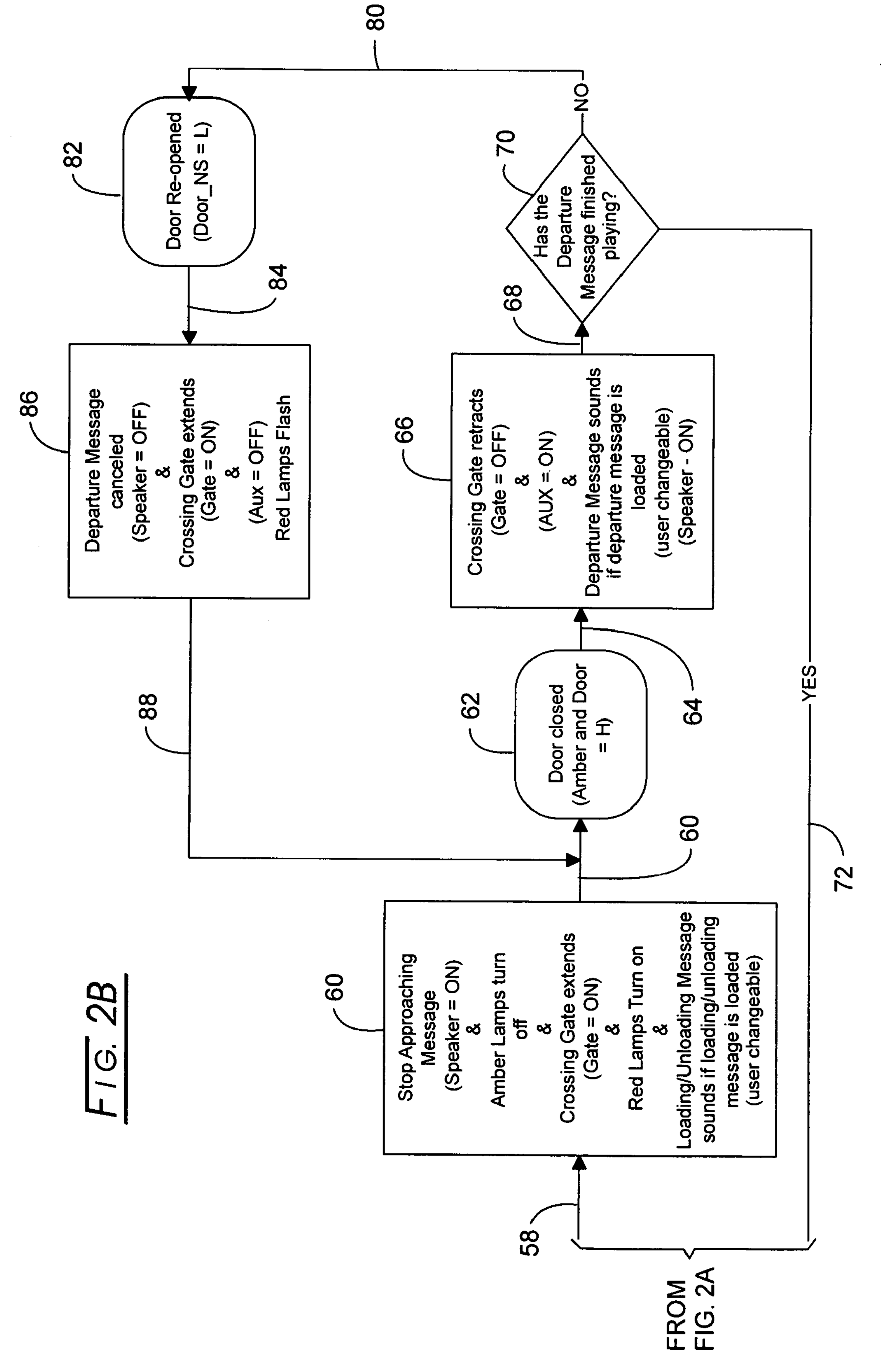
FIG. 2B
FROM FIG. 2A
58
60
Stop Approaching Message (Speaker = ON) & Amber Lamps turn off & Crossing Gate extends (Gate = ON) & Red Lamps Turn on & Loading/Unloading Message sounds if loading/unloading message is loaded (user changeable)
60
62
Door closed (Amber and Door = H)
64
66
Crossing Gate retracts (Gate = OFF) & (AUX = ON) & Departure Message sounds if departure message is loaded (user changeable) (Speaker - ON)
68
70
Has the Departure Message finished playing?
NO
YES
72
80
82
Door Re-opened (Door_NS = L)
84
86
Departure Message canceled (Speaker = OFF) & Crossing Gate extends (Gate = ON) & (Aux = OFF) Red Lamps Flash
88

BUS SAFETY CONTROLLER METHOD AND SYSTEM

CROSS-REFERENCE TO RELATED APPLICATIONS

This application claims the benefit of U.S. Provisional Application No. 60/749,822 filed Dec. 13, 2005.

STATEMENT REGARDING FEDERALLY SPONSORED RESEARCH

Not applicable.

BACKGROUND OF THE INVENTION

In the early 1990s, D. E. Rose, having spent a substantial career involving student transportation, observed the statistics that from 1951-1990, in the State of Ohio alone, over forty students were killed in accidents associated with school bus transportation. An appreciable number of these fatalities resulted from children wondering into the path of the bus as it departed from the drop site. A small child, even when crossing directly in front of the bus, may be obscured from the view of the driver who must also be attuned to approaching traffic as well as to disembarking children. Complicating the problem is the tendency of children to dawdle around the bus or to chase papers and the like underneath the bus rather than to proceed directly out of harm's way upon disembarking. Tragically, a disembarked child who has strayed too near the bus, his/her attention directed elsewhere, may be unaware of the danger engendered by the departure of the bus until it is too late for either the driver or the child to avoid a serious accident.

To militate against accidents caused by oncoming traffic and the like, many school buses have been equipped with various safety devices. School buses commonly employ red and amber signal lamps and a stop arm to alert traffic of an impending stop. In operation, with the entrance door closed, the driver actuates a manual switch to activate the flashing of the amber signal lamps to indicate the stopping of the bus. When the entrance door is moved toward the open position, the amber warning lights are deactivated and the red warning lights are actuated to indicate that children are departing from the bus. Concomitantly, a stop arm is extended to reveal additional flashing red lights as well as a stop sign configured in the symbolic shape of an octagon. Additionally, a crossing arm may be extended to force the passengers to cross the street well in front of the bus. When the entrance door is closed, all the lights are deactivated and the stop arm retracts automatically. School buses also are typically equipped with an audible electrical warning device that is actuated when the bus is in reverse gear. An audible warning signal is maintained as long as the bus is in reverse gear.

In about 1992, Rose sought to further improve student disembarking safety by providing an audibly perceptible alarm or warning cue and timing approach which responded to the opening of the bus door and remained activated for a selected time interval. Described in U.S. Pat. No. 5,293,151, issued Mar. 8, 1994, the improved safety approach was adopted by many school authorities. Later, in 2000, the departure alarm or warning cue was provided, inter alia, as a short voice message.

As many adults are aware, children of young age extending to young people in their early twenties, tend on many occasions to be impulsive, not immediately contemplating a potentially dangerous physical situation. Concerning such mental responses, investigators have long determined that different areas of the human brain develop in various ways at different rates into early childhood. However, recent imaging studies of children conducted over a period of years at UCLA and the National Institute of Mental Health in Bethesda, Md., have and are now developing a substantial body of information related to brain development, for instance, a second growth spurt in gray matter occurs just before puberty. This is followed by a thinning of such matter, the initial brain areas to mature being involved in basic functions such as sensory processing and movement, followed by regions governing special orientation and language (parietal lobe).

The last area of the brain to reach maturity is the prefrontal cortex, where the so-called executive brain resides involving social judgments, the weighing of alternatives, future planning and, importantly, holding behavior in check. This executive brain reaches maturity at about age twenty-five. It follows that young children as well as teenagers often appear to lack good judgment or the ability to restrain impulses. One neuro-imaging investigator has noted:

> We can vote at eighteen and drive a car. But you can't rent a car until you're twenty-five. In terms of brain anatomy, the only ones who have it right are the car rental people.

See generally:

National Geographic Magazine, March, 2005, pp 6-13.

Gogtay et al., "Dynamic mapping of human cortical development during childhood through early adulthood" Proc. Natl. Acad. Sci. USA vol. 101, no. 21, pp 8174-8179 (2004).

"Lack of brain maturity may explain teen crash rate" The Washington Post, Feb. 1, 2005.

In view of the foregoing, safety improvements with respect to the on-loading and off-loading of young bus passengers may be realized by supplementing the function of the immature prefrontal cortex.

BRIEF SUMMARY OF THE INVENTION

The present invention is addressed to a method and system for automatically broadcasting voice-based prompt warnings toward an embarkation and/or disembarkation location at which passengers perhaps and others will be present. These warning prompts are broadcast from a voice transmitter mounted at the front right side of the bus at a location in spaced adjacency with the bus door. This broadcast location is selected such that a multi-mode methodology is achieved wherein an approach mode voice prompt is repeatedly annunciated as the bus, with amber flashing lights activated, moves to approach the noted location. As the bus stops at this location and its door is opened, a stop mode ensues with the broadcasting, again to the location, of a stop mode voice prompt. With the subsequent closing of the door, the bus remains stationary as a standby mode takes place during which a voice-based departure warning prompt is broadcast. When that departure voice prompt is completed, the bus moves from the location.

The system provides the prompt warnings in a manner wherein these prompts are the recorded voices of one or more people having voice characteristics generally recognizable by the passengers to an extent effective to supplement the function of the immature prefrontal cortex. In this regard, for instance, for quite young elementary school students, the voice may be recognized as a favorite television cartoon character provided by the original actor or authorized qualified mimic. Further, the voices of popular teachers or individuals of merit may be employed. As students gain in age, the voice of a popular sports coach or teacher may be utilized with the objective of supplementing executive brain function. Effective quality voice recording is achieved with a microcontroller driven system performing in conjunction with A-law compressed voice data which is submitted to memory and subsequently selectively decoded to provide analog voice signals which are amplified and broadcast as noted above.

From time to time, during the standby mode of operation where the door is closed and the bus remains stopped while a disembarkation message is broadcast, a late arriving student, a parent or the like may wish to either enter the bus or have a vocal discourse with the bus driver. The system responds to such an occasion such that when the door is reopened during the standby mode, messages are no longer broadcast to permit conversation to ensue. When the door is again closed, the standby mode is reentered. In similar fashion, it may be necessary for the driver to open the bus door for purposes other than serving passengers. For example, the door should be opened at railroad crossings. Where that is the case, the system logic responds and the messages are not broadcast for such procedures.

Another feature and object of the invention provides, in an operator controlled vehicle for carrying passengers having a door actuatable between open and closed orientation for the embarkation and/or disembarkation of passengers at a location, a method for prompt warning such passengers comprising the steps:

(a) approaching such location with the vehicle to define an approach mode;

(b) initiating by the operator, the broadcasting of a voice-based aurally discernable approaching message toward the location during the approach mode to provide one or more approach warning prompts to individuals at such location;

(c) stopping the vehicle at the location to define a stop mode;

(d) automatically terminating the approach warning prompt at the stop mode;

(e) actuating the door from the closed to the open orientation at the stop mode;

(f) automatically broadcasting a voice-based aurally discernable loading message toward the location during the stop mode to provide one or more embarkation warning prompts to individuals at such location;

(g) actuating the door from the open to the closed orientation to terminate the stop mode and commence a standby mode;

(h) automatically broadcasting a voice-based aurally discernable departure message toward the location during the standby mode to provide one or more departure warning prompts to individuals at the location; and (l) automatically terminating the standby mode.

Other objects of the invention will, in part, be obvious and will, in part, appear hereinafter.

The invention, accordingly, comprises the method and system possessing the construction, combination of elements, arrangement of parts and steps which are exemplified in the following detailed description.

For a fuller understanding of the nature and objects of the invention, reference should be had to the following detailed description taken in connection with the accompanying drawings.

BRIEF DESCRIPTION OF THE DRAWINGS

FIGS. 2A and 2B combine as labeled thereon to provide a flow chart illustrating the method of the invention;

DETAILED DESCRIPTION OF THE INVENTION

In the discourse to follow, the audible prompt warning method of the invention is considered initially in conjunction with a description of the operational logic employed. Although the logic is described as applied to the incorporation of the present inventive method into the operation of a school bus, it may be understood that the invention may be used with differing forms of passenger-carried vehicles having an entrance door for the movement of passengers. Of particular note, these vocal warning prompts are developed as recorded human speech as opposed to synthesized speech. Because the passengers at hand are for the most part students who may be in early elementary grades as well as high school and college level students, quite recent research has determined that the executive function of their brain at the prefrontal cortex will have remained immature. It is this executive function which gives the mature adult human occasion to pause and contemplate any emergency situation as opposed to acting on impulse. Accordingly, the memory function of the system retains and transfers treated recorded human voice prompts recorded by one or more people having voice characteristics generally recognizable by the passengers or school children to an extent effective to supplement the function of the immature prefrontal cortex. In this regard, for instance, for quite young elementary school students, the voice may be recognized as a favorite television cartoon character provided by the original actor or authorized qualified mimic. Further, the voices of popular teachers or individuals of merit may be employed. As the students gain in age, the voice of a popular sports coach or teacher may be utilized with the objective of supplementing executive brain function. These messages are directed to the location where the students may be standing to embark or disembark from the school bus.

Following a description of the methodology at hand, the discourse turns to a discussion of the microcontroller-driven system and the intended simplicity of its installation in retrofitting school buses or incorporating it in the vehicles at the time of their manufacture.

Figure 1:
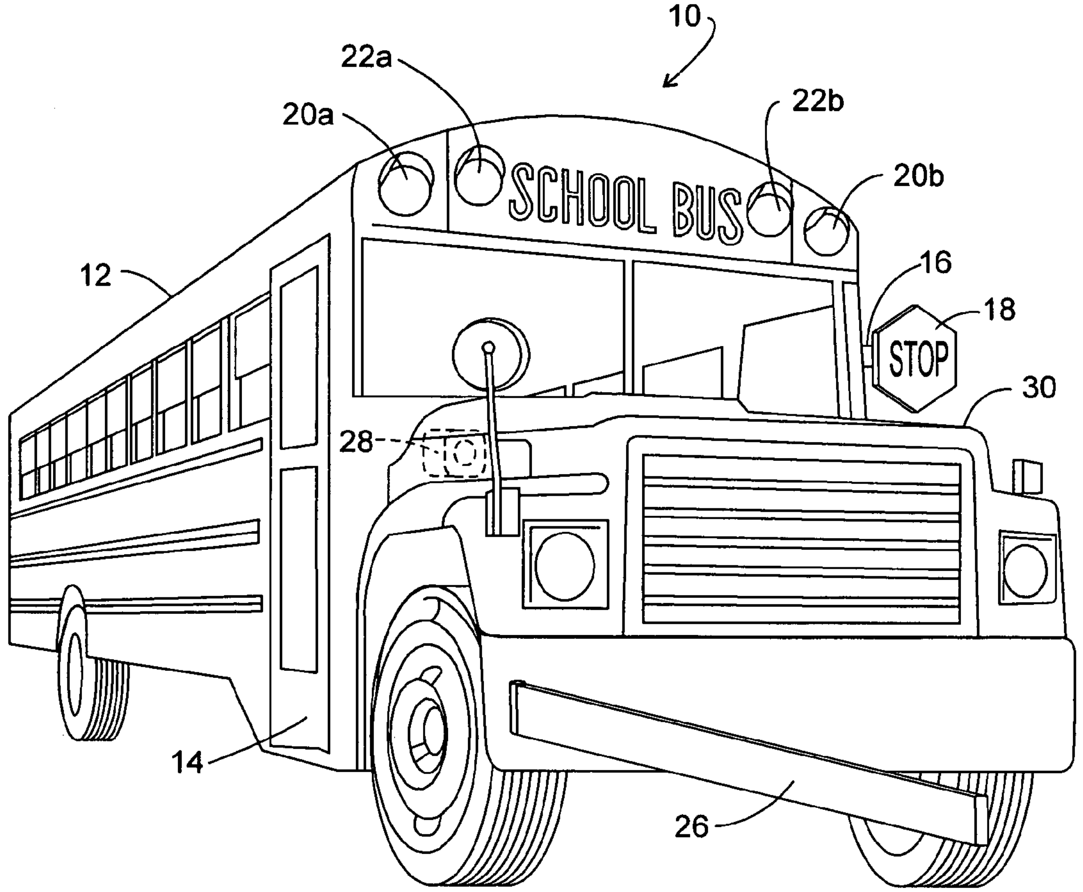
FIG. 1 is a perspective view of a school bus incorporating the system of the invention.

Referring to FIG. 1, a school bus is represented generally at 10. Bus 10 has a body 12 supporting a driver actuatable door 14. Mounted onto body 12 may be seen a number of conventional safety devices which will be seen to be operated in conjunction with the instant method and system. The type and number of such safety devices typically is mandated by state and local school authorities, for instance, an extensible stop arm 16 is extensible between a retracted and an extended orientation. Typically, a red sign 18 having the familiar octagon icon and customarily bearing the word "STOP" is mounted onto the end of the stop arm 16 to visibly cue local motorists to bring their vehicle to a stop. The visual effect of sign 18 is often enhanced by providing it with one or more flashing red warning lights (not shown). Contemporaneous motorists are also provided visual cues via the flashing of warning lights which are conspicuously mounted at both the front and rear of the bus 10. Seen in the figure is an arrangement of red forward child pick-up lights 20*a* and 20*b*. A similar pair of such red flashing lights are provided at the rear of the bus. Next to the red flashing lights are amber caution lights, the forward ones being shown at 22*a* and 22*b*. A similar pair of such warning lights is provided at the rear of bus 10. In conventional operation, as the bus driver approaches a pick-up or drop-off location, the flashing amber lights are manually turned-on. This is an approach mode. As the bus 10 reaches that location and comes to a halt or stop, the amber warning lights are turned-off and the red flashing lights are turned on and the stop arm 16 is extended. In this stop mode, a crossing arm or gate 26 may be actuated from a retracted into an extended position or orientation for directing disembarking passengers to cross in front of the bus at a distance placing them within the unobstructed view of the driver. Bus 10 also is seen to support a weather and/or environment immune loudspeaker or broadcaster shown in phantom at 28. Speaker 28 is located such that the recorded human voice warning prompts will be heard by students at the physical transactional location during the approach mode; during the stop mode; during a standby mode following the stop mode; and during a departure mode as the flashing stop mode lights are turned off, gate 26 is retracted and the bus 10 is driven from the noted location. Note that the speaker 28 is mounted on the firewall under hood 30 adjacent the door at the right side of the bus.

Some school authorities mandate still additional or auxiliary child safety alarm components, for example, certain school districts call for a grill-mounted strobe light (not shown).

Figure 2A:
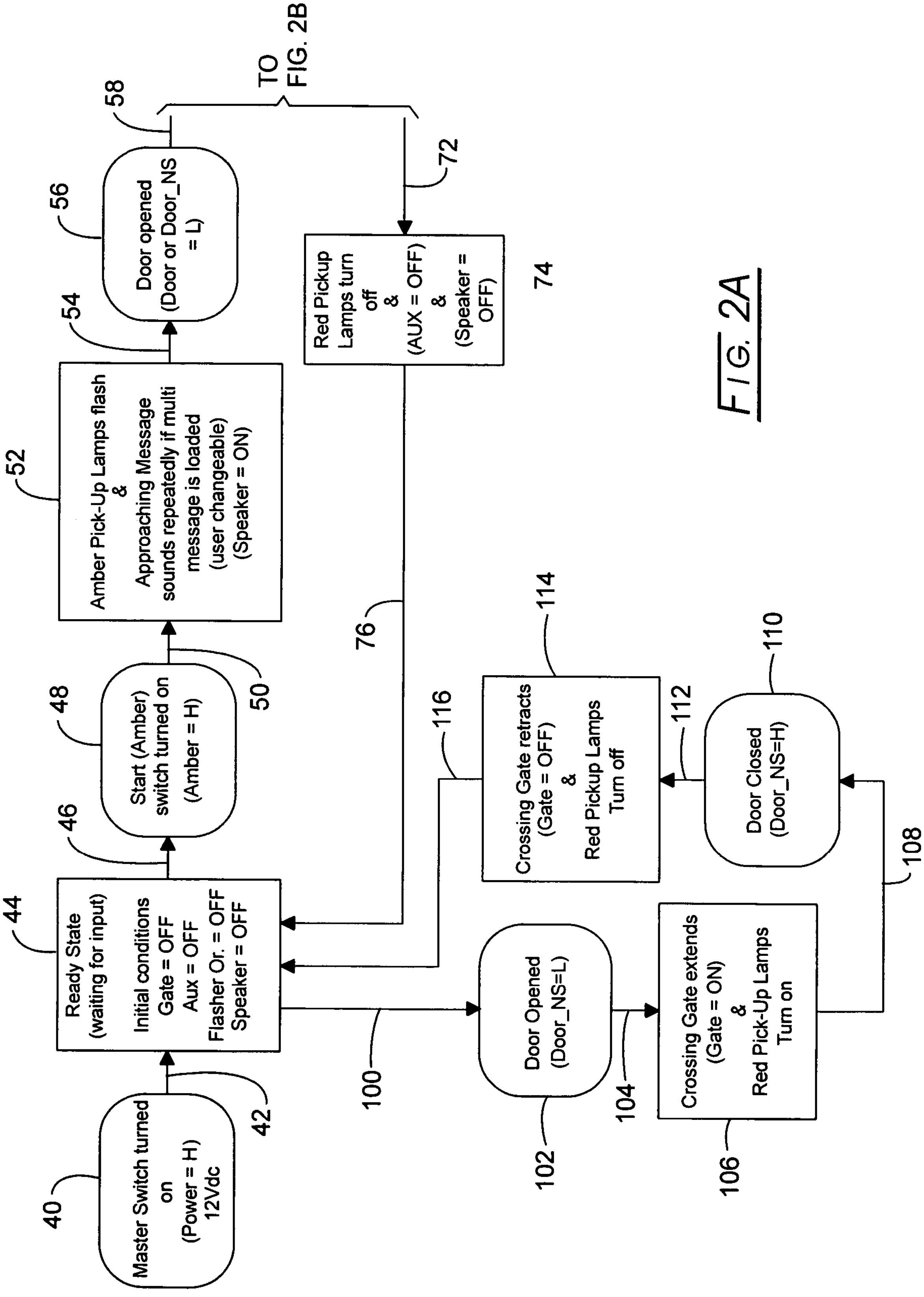

Turning now to the logic and methodology associated with the prompt warning system, reference is made to FIGS. 2A and 2B which should be considered together and labeled thereon. The system utilizes the d.c. power supply of the bus 10 which at the present time is 12 volts d.c. Preferably, at such time as bus 10 is at its overnight parking facility and is about to be put into service, as represented at block 40 in FIG. 2A, the operator turns on a master or power switch and power is applied to the system as represented by the term: "Power=H". With power now being supplied to the system, as represented at arrow 42 and block 44, the system is in a ready state awaiting an operator input. In this ready state, the initial conditions are such that power is off to the crossing gate 26 (FIG. 1); power is off to any installed child safety alarm auxiliary device such as the earlier-noted grill strobe; a red flasher override function is off; speaker or broadcaster 28 is off.

From this ready state as represented at block 44, the system can enter either a sequential form of operation or a non-sequential one. The latter, non-sequential operation is employed for stopped and door open conditions wherein passengers are not involved. For instance, school authorities require that buses stop and open the door thereof at railroad crossings. For this non-sequential performance, the audio speech warning prompts are not used.

Assuming a sequential performance is at hand, as represented at arrow 46 and block 48, the driver or operator actuates a start switch to an on condition. This on or logic high condition causes the amber approach mode lights as described at 22*a* and 22*b* to commence to flash as represented by arrow 50 and block 52. An approach mode is now underway and bus 10 is directed toward the passenger loading/unloading location. Amber pick-up lamps as at 22*a* and 22*b* now are flashing and an approaching message is sounded repeatedly from broadcaster or speaker 28 toward the passenger pick-up location. These messages are changeable and will warn those standing at the pick-up location to stay back, the bus is now approaching and is about to stop. This message or messages are repeated until the stop mode commences. Note that the speaker is on or operating. When the bus 10 reaches the noted location and is stopped, as represented at arrow 54 and block 56, the stop mode is entered, the operator or driver actuating the door 14 from a closed to an open orientation. This provides for the logic conditions Door or Door_NS to assume a logic low condition. A stop mode having commenced, as represented at arrow 58 and block 60 as seen in FIG. 2B, a stop mode is underway wherein the approaching messages are stopped; the amber flashing lamps are turned off; crossing gate 26 is actuated from its retracted to its extended orientation; the red flashing lamps are turned on; and loading/unloading messages are broadcast from speaker 28. Those messages are heard by students both disembarking and embarking. In this regard, the initial messages will urge those students standing at the pick-up location to move out of the way to permit the debarkation of any students leaving the bus. The message also may prompt those students standing at the location to listen to the instructions of the driver as they embark. Students also may be cautioned about crossing the street in front of the bus.

As represented at arrow 60 and block 62, the stop mode is terminated when the driver or operator of bus 10 closes door 14. This provides logic input to the system wherein logic representing an actuation of the amber flashing lights and representing the condition of the door are developed (Amber and Door=H). This activity evokes the commencement of a standby mode as represented at arrow 64 and block 66. During this standby mode, as described in the seminal patent Rose (supra) bus 10 does not move and a voice based departure message is broadcast from speaker 28 providing warning prompts to those passengers now off the bus and at the location or bus stop. During the standby mode, crossing gate 26 is retracted, gate logic being in an OFF condition; and any auxiliary child safety alarm features are turned on. This standby mode continues, until as represented at arrow 68 and block 70, a determination is made as to whether the departure message or messages have finished playing. In the event that they have so finished playing, then as represented at arrow 72 extending to FIG. 2A and block 74 the flashing red lamps are turned off; any auxiliary child safety alarms are turned off; and the speaker status is OFF. The system then returns to the ready state as represented at arrow 76 and block 44.

Returning to FIG. 2B and the query posed at block 70, where the departure message has not finished playing and the standby mode still obtains, as represented at arrow 80 and block 82 there are circumstances wherein the door will be actuated by the operator or driver from a closed orientation again to an open orientation. Such occurrences may develop where a student is slightly late to get to the bus and wishes to board or a parent or the like may wish to converse with the driver though the now open door. As represented at arrow 84 and block 86, the standby mode is terminated with a cancellation of the departure message; the crossing gate 26 is actuated from its retracted to its extended orientation; the auxiliary child safety alarm, if any, is turned off and the red lamps continue to flash. As represented at arrow 88 extending to arrow 60, the standby mode again will be entered at such time as the driver again closes the door. Accordingly, under logic wherein the arrival mode has occurred and the standby mode is underway, where the operator re-actuates the door from a closed to an open orientation, the departure voice prompt is automatically terminated. When the door again is closed, the standby mode is automatically reentered.

Returning to FIG. 2A, non-sequential performance now is addressed. As noted above, this feature may be employed for stopping bus 10 and opening door 14 at railroad crossings. With the system in a ready state as represented at block 44, the non-sequential performance feature is entered as represented at arrow 100 and block 102. For this situation, the start switch (flashing amber lamps and approach messages) have not been turned on, however, the door has been opened. With the opening of the door, as represented at arrow 104 and block 106, crossing gate 26 is actuated from its retracted orientation to its extended orientation and the red lamps are turned on to flash. The driver having assurance that no danger is at hand, as represented at arrow 108 and block 110 the door is closed, and as represented at arrow 112 and block 114, crossing gate 26 is actuated to its retracted orientation and the red flashing lamps are turned off. The system then returns to the ready state at block 44 as represented at arrow 116. It may be noted that no voice-based warning prompts occur for this non-sequential procedure.

Figure 3:
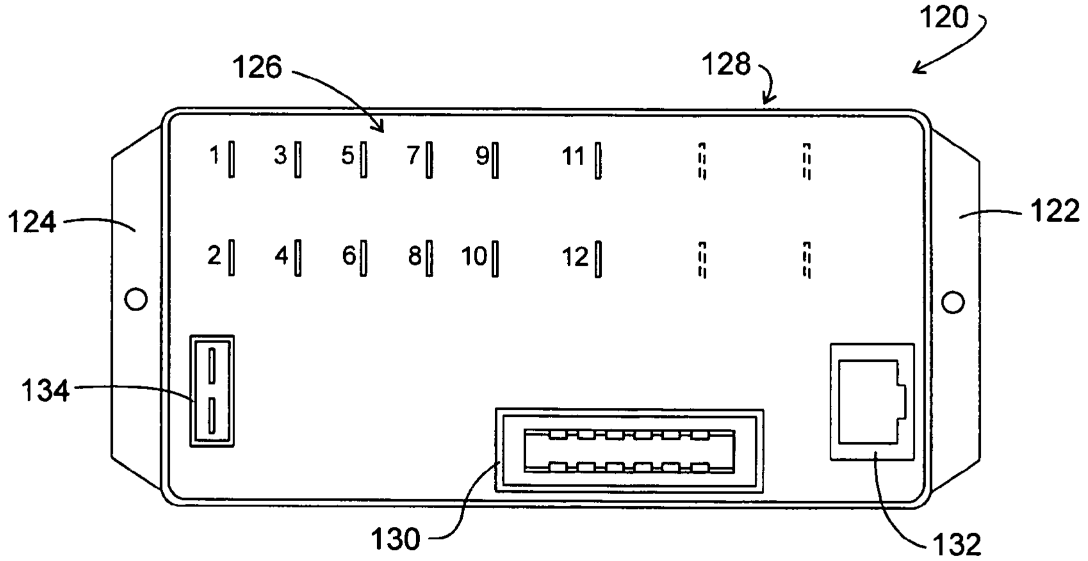
FIG. 3 is a front view of a housing supporting the circuit components of the system of the invention.

The system of the invention is quite simple and thus cost effective to install within a bus. A small standardized housing is employed in conjunction with a speaker as at 28 and simple harnessing designed with respect to some variations in the electrical configurations of buses of differing manufacturers. Referring to FIG. 3, a polymeric housing which supports the electronic components of the system is represented generally at 120. Housing 120 is attached to the interior of bus 10, for instance, employing sheet metal screws in conjunction with apertured flanges 122 and 124. Connection with the electrical components of an associated bus is through conventional bladed terminals represented generally as terminal array 126 comprised of active terminals which are labeled 1-12. For added design implementations, an array of four additional terminals represented generally at 128 are represented in phantom. Below these terminal arrays 126 and 128 is a twelve pin input/output connector 130 which essentially parallels the bladed connector array 126. The interiorly disposed electronics within housing 120 are potted and thus inaccessible for avoidance of vandalism or the like. Accordingly, serial communication to an onboard microcontroller is provided through a serial port 132 which may be an RJ45 connector which is configured in RJ11 fashion. Through this serial port the voice messaging may be entered into the system, programs changed and the like. Finally, housing 128 supports an audio output connector 134 for connection to speaker 28.

Figure 4A:
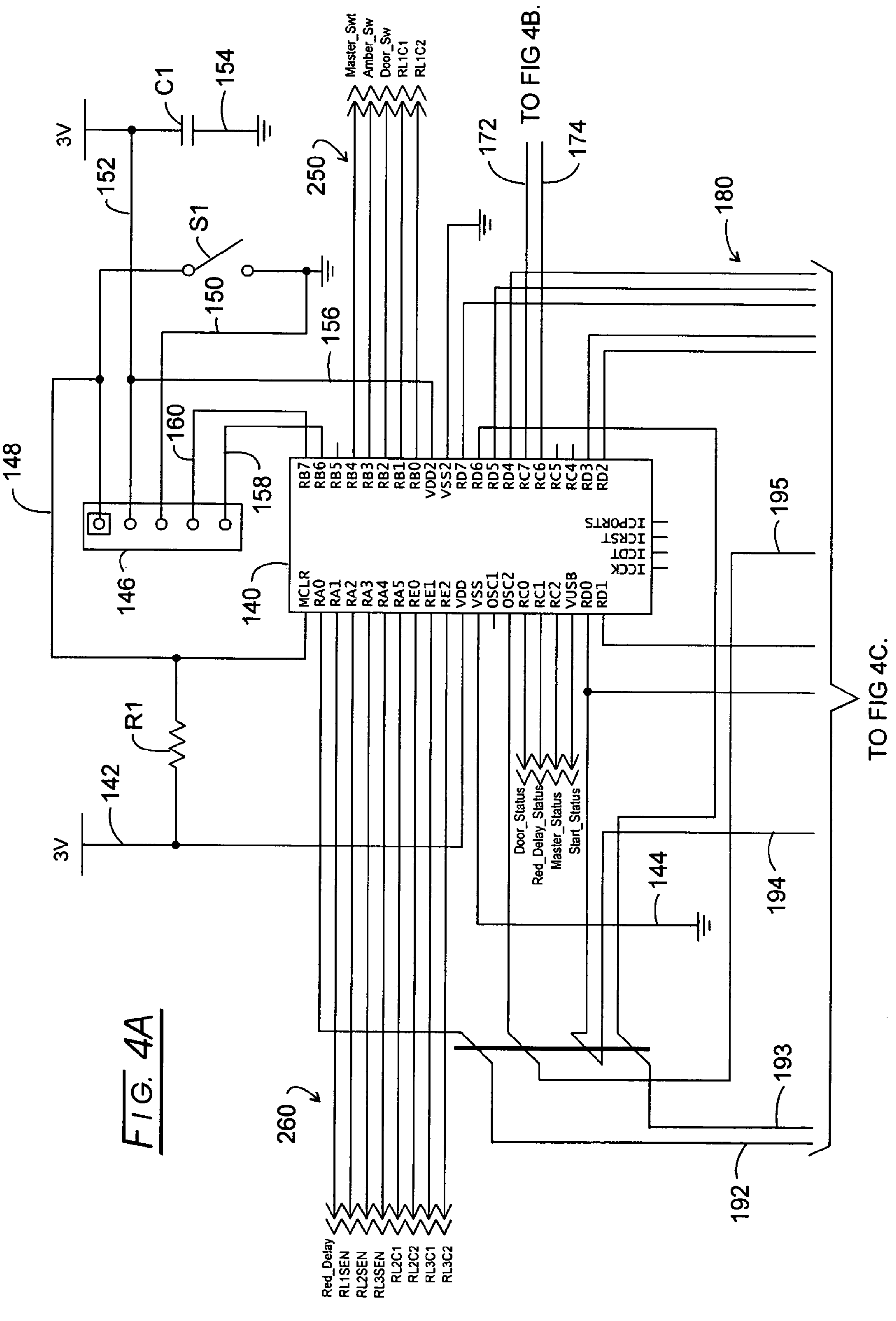
FIGS. 4A-4C combine as labeled thereon to provide an electrical schematic diagram of the system of the invention.
Figure 4B:
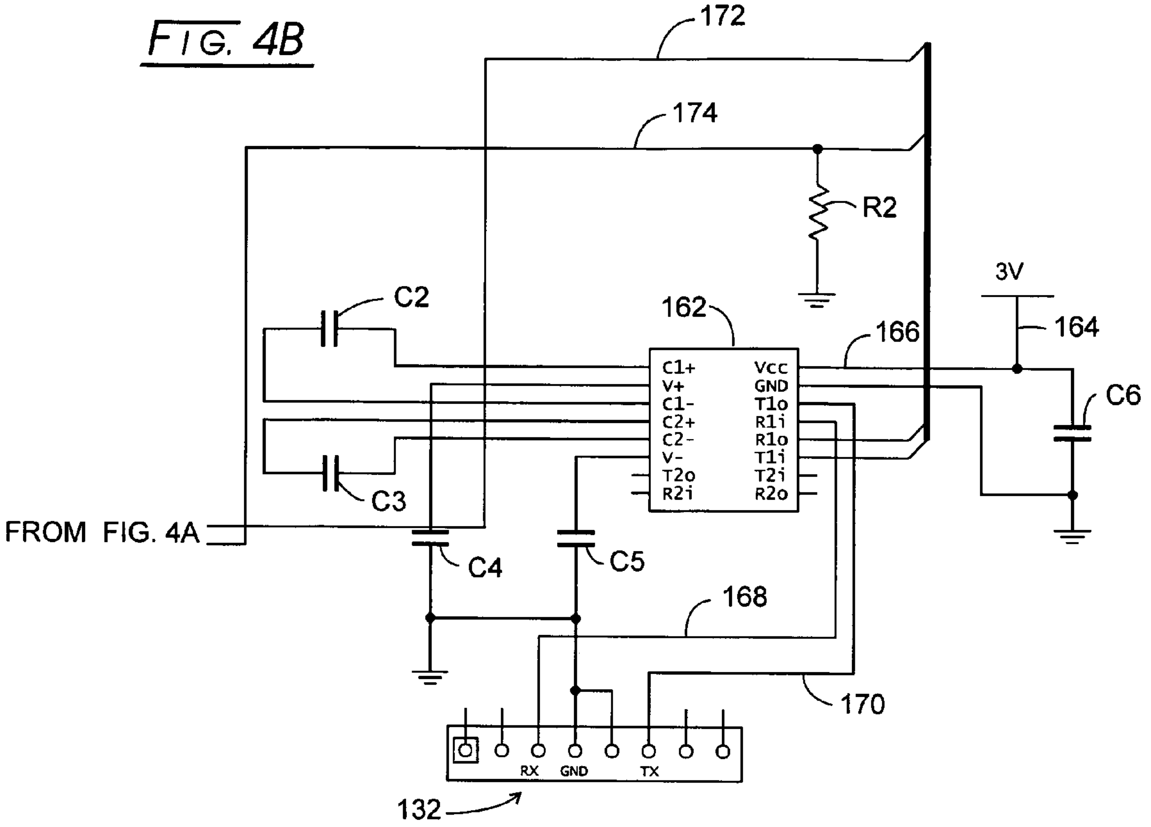
Figure 4C:
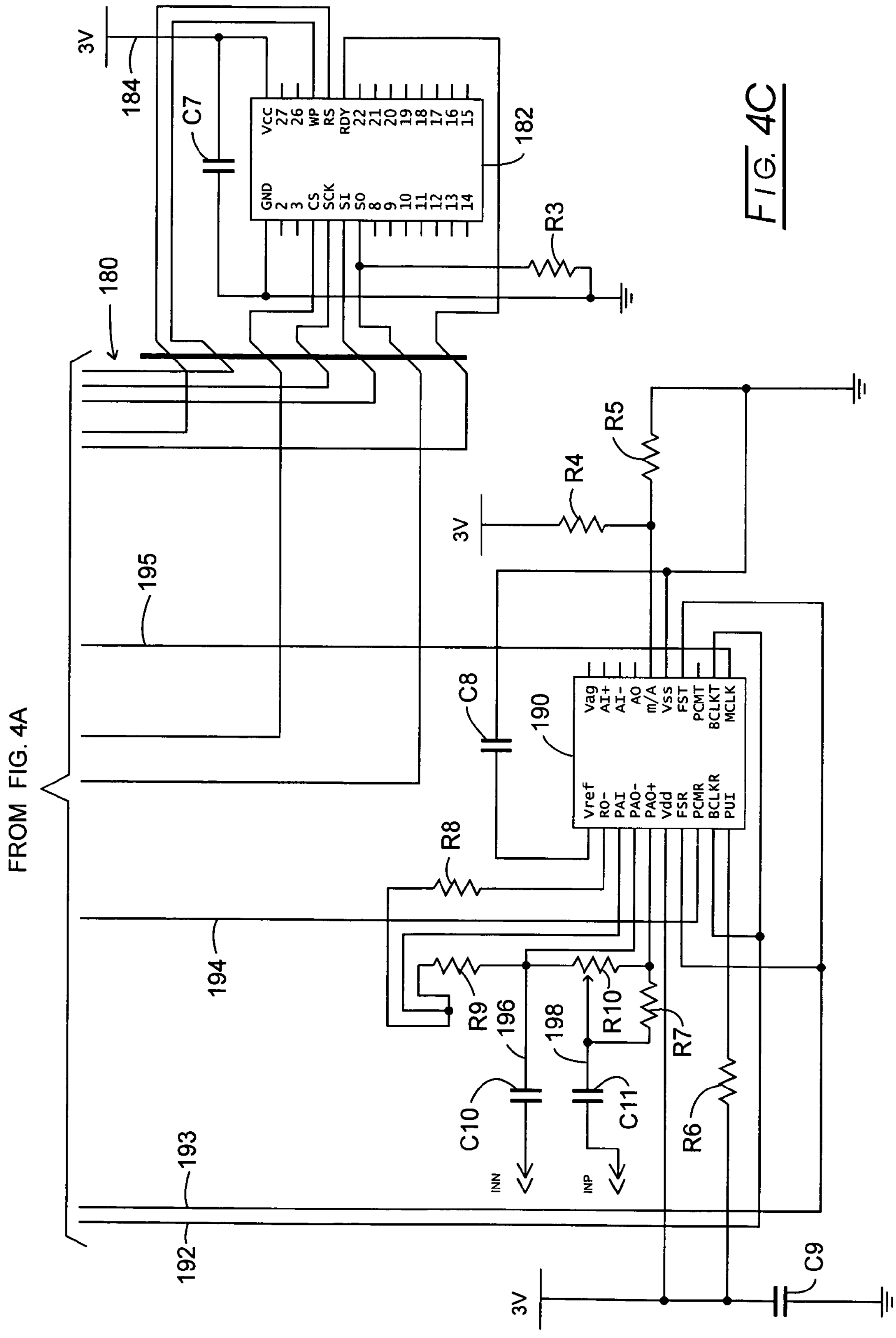

FIGS. 4A-4C should be considered together in the manner labeled thereon. Referring to FIG. 4A, the system digital control features a microcontroller-based logic center as represented at 140. Microcontroller 140 may be provided as a type PIC18F4550T-1/PT device marketed by Microchip Technology, Inc. of Tempe Arizona. The VDD terminal of device 140 is coupled with +3V via line 142 and its VSS terminal is coupled to ground via line 144. Programming of microcontroller 140 may be carried out prior to potting at connector 146. As part of this bench device configuration, line 142 is seen to extend through resistor R1 to reset line 148 which, in combination with ground line 150 and reset switch S1 may be made to carry out a reset function manually. Subsequent to potting, the device 140 automatically resets on startup. Connector 146 further is configured as connected to +3V from lines 152 and 154, the latter incorporating a filtering capacitor C1. The VDD2 terminal of device 140 is coupled with line 152 via line 156 and it further is connected with the RB6 and RB7 terminals of device 140 via respective lines 158 and 160.

Subsequent to potting procedures, microcontroller 140 may be externally programmed and receive human voice data for submittal to memory. That data transfer is provided via the serial port 132 described in connection with FIG. 3. Looking additionally to FIG. 4B, port 132 reappears with the same identifying numeration in operative association with a communication interface 162 providing RS-232 performance. For operation with a 3V supply seen at lines 164 and 166, device 162 is configured with capacitors C2-C5 as well as a filtering capacitor C6. Receive and transmit communications with port 132 are represented respectively at lines 168 and 170 and the corresponding outputs to microcontroller 140 are seen respectively at lines 172 and 174. A resistor R2 is coupled between transmit line 174 ground.

Human voice prompts recorded by one or more people having voice characteristics generally recognizable by the passengers at bus 10 to an extent effective to supplement the function of the immature prefrontal cortex are treated by A-law compression and may be submitted via port 132 to microcontroller 140 via lines 172 and 174. Returning to FIG. 4A and looking additionally to FIG. 4C, this compressed digitized voice data is directed by device 140 to an 8-megabit serial interface flash memory 182 configured with capacitor C7 from a resistor R3 and coupled with +3V power supply at line 184. Device 182 may be provided as a type AT45DB081B flash memory with a main memory organized as 4,096 pages of 264 bytes each. The device also contains two SRAM data buffers of 264 bytes each. These buffers allow a receiving of data while a page in the main memory is being reprogrammed, as well as writing a continuous data stream. Memory 182 is configured with a capability for two minutes of audio capability. The memory system is divided into 8 fifteen second "files" thus, fifteen seconds is available per voice message prompt. Obtaining a telephone quality message requires 14 bits of accuracy or resolution and at least 4 KHz of bandwidth. Putting out 8 bits of data at 8 KHz represents a Nyquist rate, the minimum rate that an analog signal must be sampled in order to be represented in digital form at the 4 KHz range according to the Nyquist theories. Looking additionally to FIG. 4C, A-law compressed voice data is directed from microcontroller 140 to a general-purpose signal channel POM CODEC 190. In this regard, communication between these devices 140 and 190 is by lines 192-195. Provided as a type W681310 device 190 is marketed by Winbond Electronics Corp of Hsinchu Taiwan. Device 190 is configured for performing as a decoding assembly with resistors R4-R9 and capacitors C8 and C9, and carries out decompression or decoding to provide analog human voice signals at output lines 196 and 198. Lines 196 and 198 respectively incorporate coupling capacitors C10 and C11. A volume control or 10-turn potentiometer represented as R 10 provides a volume control over the voice message output. However, in view of the potting protection provided in conjunction with housing 120, that potentiometer is not available in normal usage. In general, the system will provide a voice output from broadcaster or speaker 28 at an average loudness of just under about 100 db at a 3 foot range. Accordingly, where the system is being demonstrated, for example, indoors at a trade show or the like, it is desirable that the volume be lowered to an acceptable demonstration range. Accordingly, for that particular demonstrative use, the circuitry is not potted.

Figure 5:
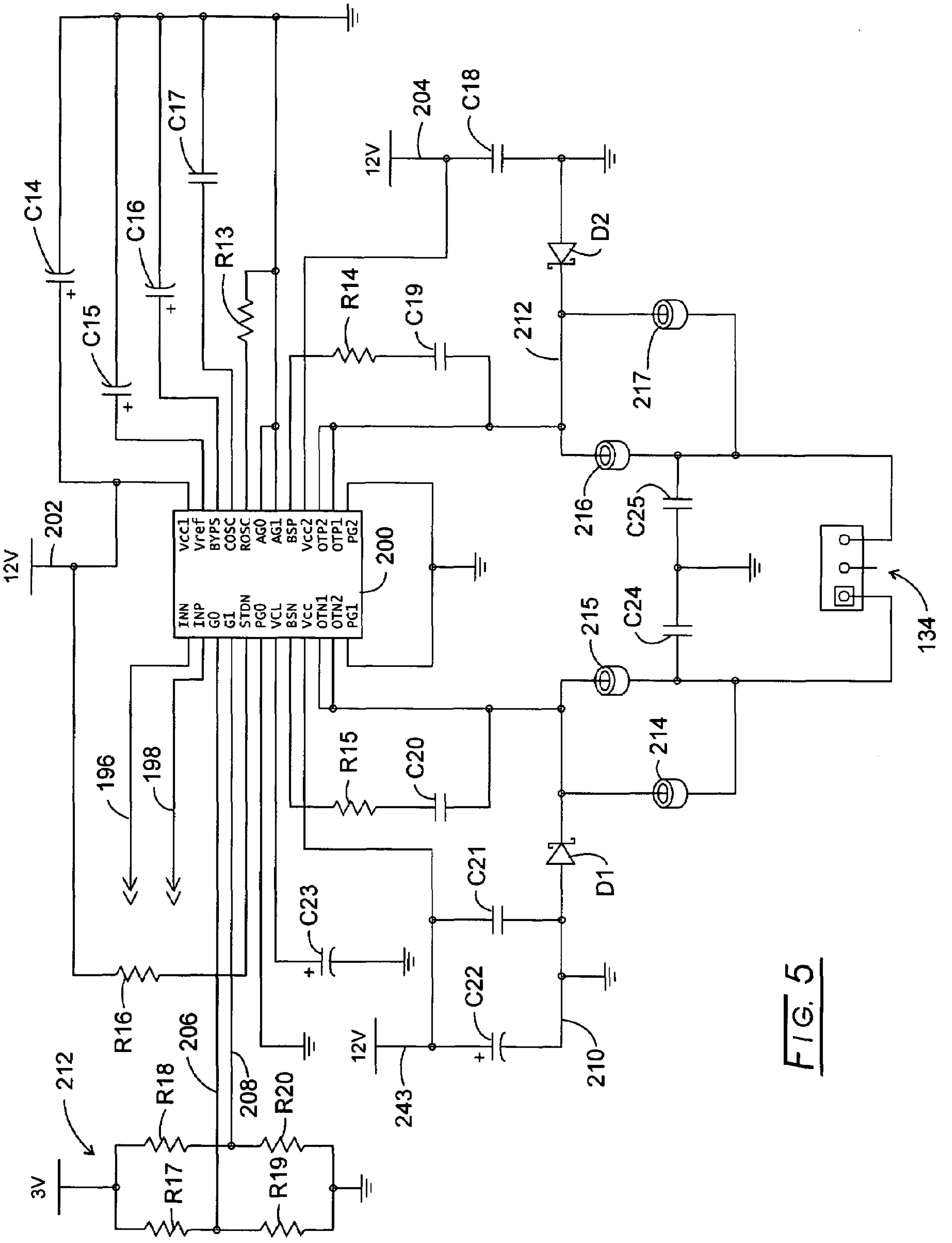
FIG. 5 is an electrical schematic diagram of an amplifier employed with the system of the invention.

Referring to FIG. 5, the decoded analog human voice signals at lines 196 and198 reappear extending to the respective INN and INP terminals of a power output amplifier 200. Device 200 may be provided as a 20 watt mono bridge-tied load (BTL) class D audio power amplifier, marketed by Texas Instruments, Inc. of Dallas, Texas as a type TPA3001D1. The device exhibits a high efficiency eliminating the need for heat sinks and is capable of driving 4 ohm or 8 ohm speakers with only ferrite bead filters to reduce EMI. Coupled with treated 12V power supply as at lines 202-204 and configured with capacitors C14-C25 and resistors R13-R16, device 200 responds to logic level gain inputs at lines 206 and 208 to provide outputs at lines 210 and 212 which extend to the earlier described audio output connector 134 which is again identified by that same numeration. The gain input at lines 206 and 208 is at a logic level and is derived from a network represented generally at 212 by selecting from resistors R17-R20.

Output lines 210 and 212 are seen to incorporate Schottky diodes D1 and D2 and the above-noted ferrite beads are seen at 214-217.

Figure 6:
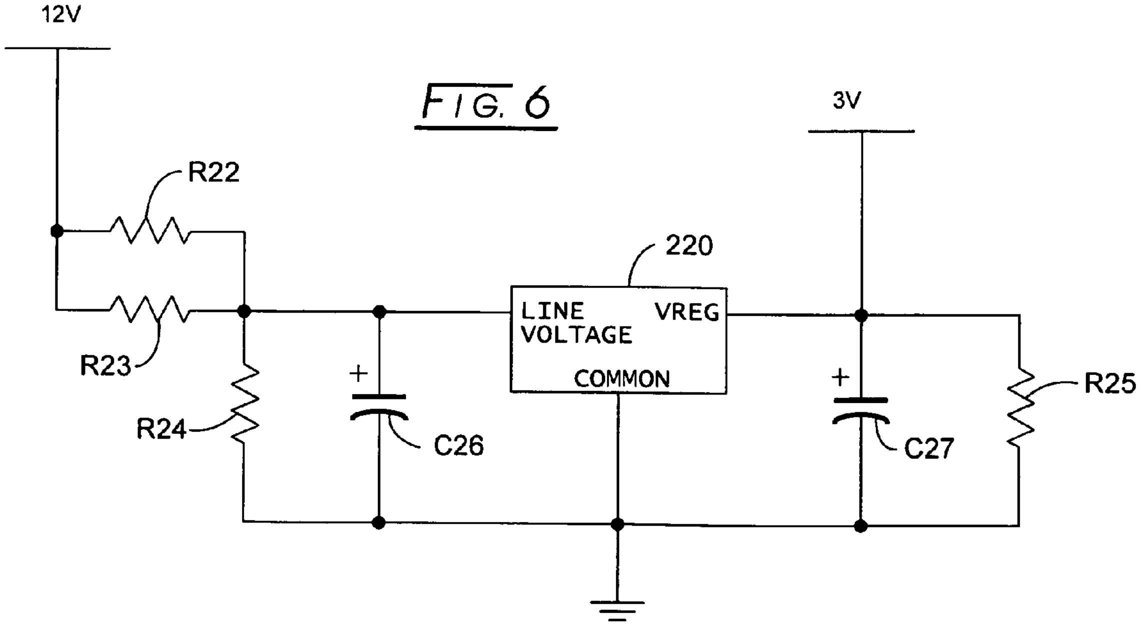
FIG. 6 is an electrical schematic diagram of a power source employed with the system of the invention.

Looking momentarily to FIG. 6, the regulating power supply for the system is revealed as incorporating a type KF33BBP power supply device 220 which is configured with resistors R22-R25 and capacitors C26 and C27 to provide regulated 3.3V which is distributed within the circuitry. The use of a digital approach to voice storage and generation provides a valuable flexibility and voice recognition accuracy to the system.

It may be recalled from FIG. 3 that the blade contacts of array 126 are numbered 1-12. Looking to FIG. 7, certain of that connector identifying numeration is repeated in conjunction with networks immediately associated with them, four of which are identified in general at 230-233. Network 230 is associated with bus ground and is represented at lines 240 and 242, the latter line identified ground being distributed to the circuitry. Line 240 is associated with connectors 1 and 2.

Network 231 is operationally associated with connectors 3 and 4, the former being associated with the non-sequential form of door opening and is seen connected with line 244. Line 244 is coupled with dividing resistors R26 and R27 coupled between 12V and ground for conversion to a 3V logic level. to establish a 6V switching function. Below those resistors is a large resistor R28. Below resistor R28, line 244 is coupled with line 246 which, in turn, is coupled with logic level 3.3V and incorporates filtering resistor R29 and diode D3. Line 244 then is coupled with signal line 248 which incorporates filtering capacitor C28 and is coupled with microcontroller 140 at a lead array represented generally at 250 (FIG. 4C).

Certain authorities desire that whenever the bus is in operation and door 14 is open, an assurance is called for that the red flashing lamps will be activated. Accordingly, network 231 incorporates a red flasher override formed with line 252 extending from line 244 above resistors R26 and R27 and coupled with the blade contact identified as number 4. Line 252 incorporates a Schottky diode D4 as well as a surge protector 254 coupled between line 252 and ground. The red flasher override is developed at line 256 incorporating Schottky diode D5 and NPN transistor Q1. The emitter of transistor Q1 is coupled to ground and its base is connected with line 258 incorporating base resistor R30 and responsive to an output from microcontroller 140 located at a lead array represented generally at 260. Accordingly, with the signal condition asserted at line 258, transistor Q1 is turned on to bring connector blade 4 to a ground condition. Diode D4 insured that the red flasher drive (4) is at a logic low when the door (3) is at a logic low. Transistor Q1 maintains the red flasher drive (4) at a logic low when the door is closed and the departure message is playing.

Network 232 is concerned with blade connectors 5 and 6 which are associated with door 14 status and are seen coupled with line 262. Similar to network 231, network 232 is formed with a line 264 which in turn is coupled with line 266 incorporating divider resistors R31 and R32 and extends between +12V supply and ground. A large resistor R33 is located within line 264 below line 266. Below resistor R33 is line 268 coupled with line 264 and incorporating filtering resistor R34 and diode D6, line 268 being coupled to receive logic for level 3.3V operation. Line 264 then continues to line 270 incorporating filtering capacitor C29 and carrying amber flashing data represented at microcontroller 140 within lead array 250.

Network 233 incorporates line 276 which is coupled between connector blades 7 and 8 and is associated with the activation status of the amber flashing lamps. In this regard, line 278 incorporating steering diode D7 extends to line 280 incorporating divider resistors R35 and R36 and extends between 12V source and ground to, as before, establish a 3.3V logic form of switching activity. Below line 280 is a large resistor R37 and below that resistor is line 282 incorporating filtering resistor R38 and diode D8 which are coupled between logic 3.3V supply and ground. Line 278 extends below line 282 to line 284 incorporating filtering capacitor C30 and carrying switch data extending to microcontroller 140 via lead array 250.

Figure 8:
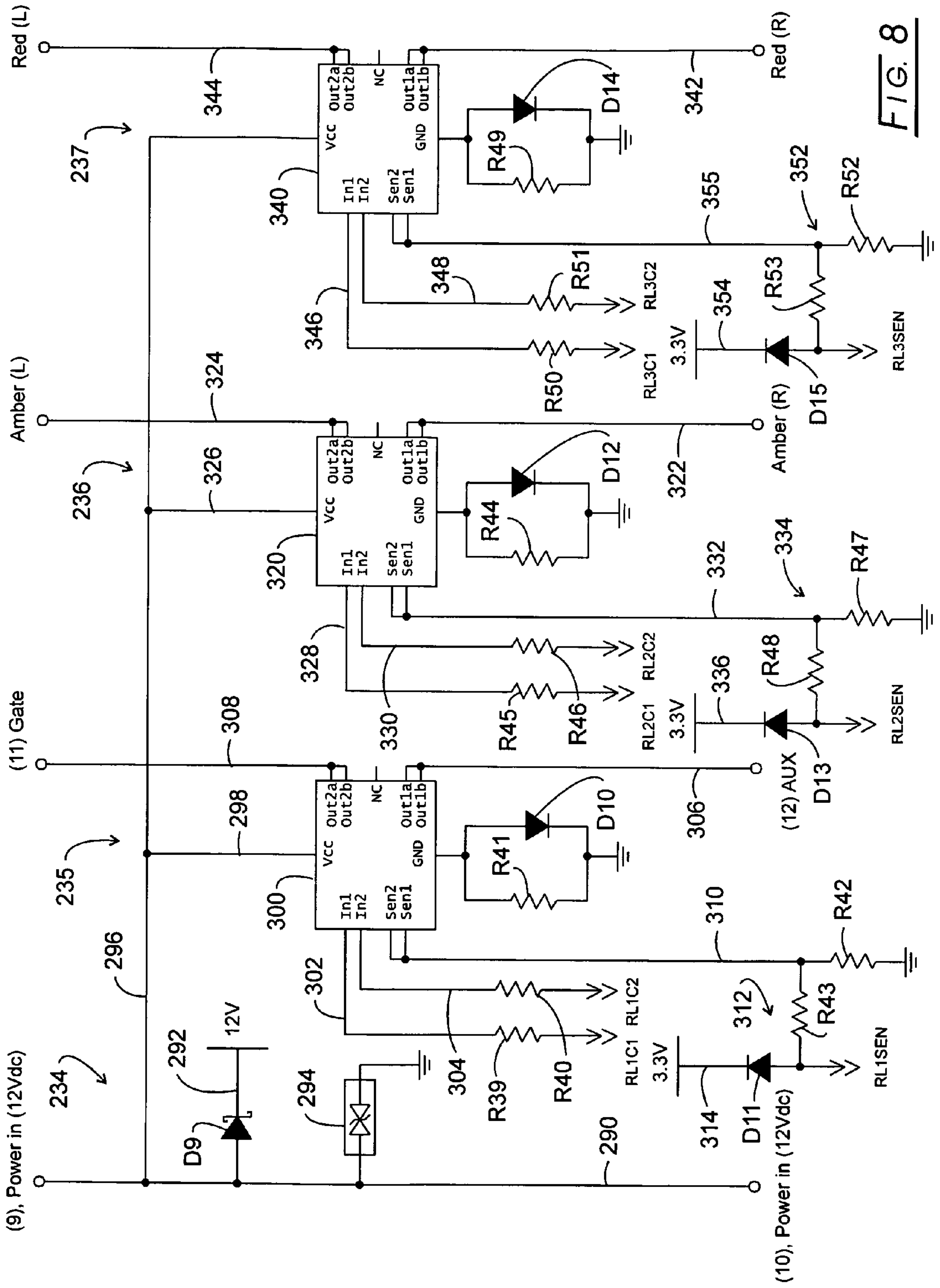
FIG. 8 is an electrical schematic diagram illustrating additional networks associated with blade terminals shown in FIG. 3.

Continuing to FIG. 8, network 234 is associated with blade connectors 9 and 10 which carry 12V d.c. as represented at line 290. Line 290 is tapped at line 292 incorporating Schottky diode D9 and providing distributed 12V power supply to the circuitry. A surge protector 294 is coupled between line 290 and ground. The 12V supply at line 290 is seen tapped at line 296 which extends to succeeding networks 235-237. At network 235, line 296 is tapped by line 298 extending to the Vcc terminal of a double channel high side solid state relay 300 having control inputs at lines 302 and 304 incorporating respective input resistors R39 and R40 and extending to microcontroller 140 from lead array 250. One output of device 300 at line 306 extends to bladed connector 12 and functions to turn-on the noted auxiliary child warning system such as a grill strobe. The second output of device 300 at line 308 extends to connector blade 11 and functions to actuate gate 26 between its retracted and extended orientations. The ground terminal of device 300 is coupled to ground in connection with a filtering resistor and diode shown respectively at R41 and D10. The two sensing terminals of device 300 are connected in common with line 310 which extends to a mirroring network represented generally at 312 incorporating resistors R42 and R43. Resistor R43 is coupled with line 314 extending to 3.3 logic voltage, incorporating diode D11 and a logic output extending to microcontroller 140 at lead array 260 (FIG. 4A). The signal at line 314 thus conveyed will reflect a proportional fraction of the current supplied and may be employed as an indicator of either a short exhibited as a high current level or no current flow at all. Devices as at 300 are produced, for example, by FT Microelectronics, NV having a sales entity in Indianapolis Ind. and may, for example, be provided as a type VND600SP.

Network 236 also is formed with a double channel high side solid state relay 320 which may be identical to relay 300. The two outputs of relay 320 at lines 322 and 324 may be utilized to energize and flash amber lamps as at 22*a* and 22*b* (FIG. 1) and will employ one of the additional blade connectors within array 128 (FIG. 3). The Vcc input to device 320 is provided from line 296 via line 326 and its ground terminal is coupled to ground in combination with resistor R44 and diode D12. Control input to the device 320 is from lines 328 and 330 incorporating respective input resistors R45 and R46. These control lines extend from microcontroller 140 at lead array 260. The sensing terminals of device 320 are commonly connected at line 332. As before, line 332 extends to a mirroring network represented generally at 334 incorporating resistors R47 and R48. The latter resistor extends to line 336 incorporating diode D13 and coupled between logic regulated power source level 3.3V and extending to provide a current related input to microcontroller 140 at lead array 260 (FIG. 4A).

Network 237 also may be coupled with a blade connector at array 128 seen in FIG. 3. As before, the network performs in conjunction with a double channel high side solid-state relay 340, the power into which is provided from line 296. Relay 340 is configured for providing stand alone power to the red flashing lamps as described at 20*a*, 20*b* in FIG. 1. In this regard, the right red flashing output is presented at line 342, while the left red flashing output is presented at line 344. Device 340 may be identical to that described at 300 and is shown having its ground terminal coupled in combination with resistor R49 and diode D14 to ground. Control to device 340 is from lines 346 and 348 which extend from microcontroller 140 at lead group 260 as described in connection with FIG. 4A. The sensing outputs of device 340 are combined at line 350 which extends to a mirroring network represented generally at 352 and incorporating resistors R52 and R53, the latter resistor extending to line 354 coupled with logic level regulated power source and incorporating diode D15. Line 354 provides a current related input to microcontroller 140 from within lead array 260 in similar fashion as networks 312 and 334.

Figure 9:
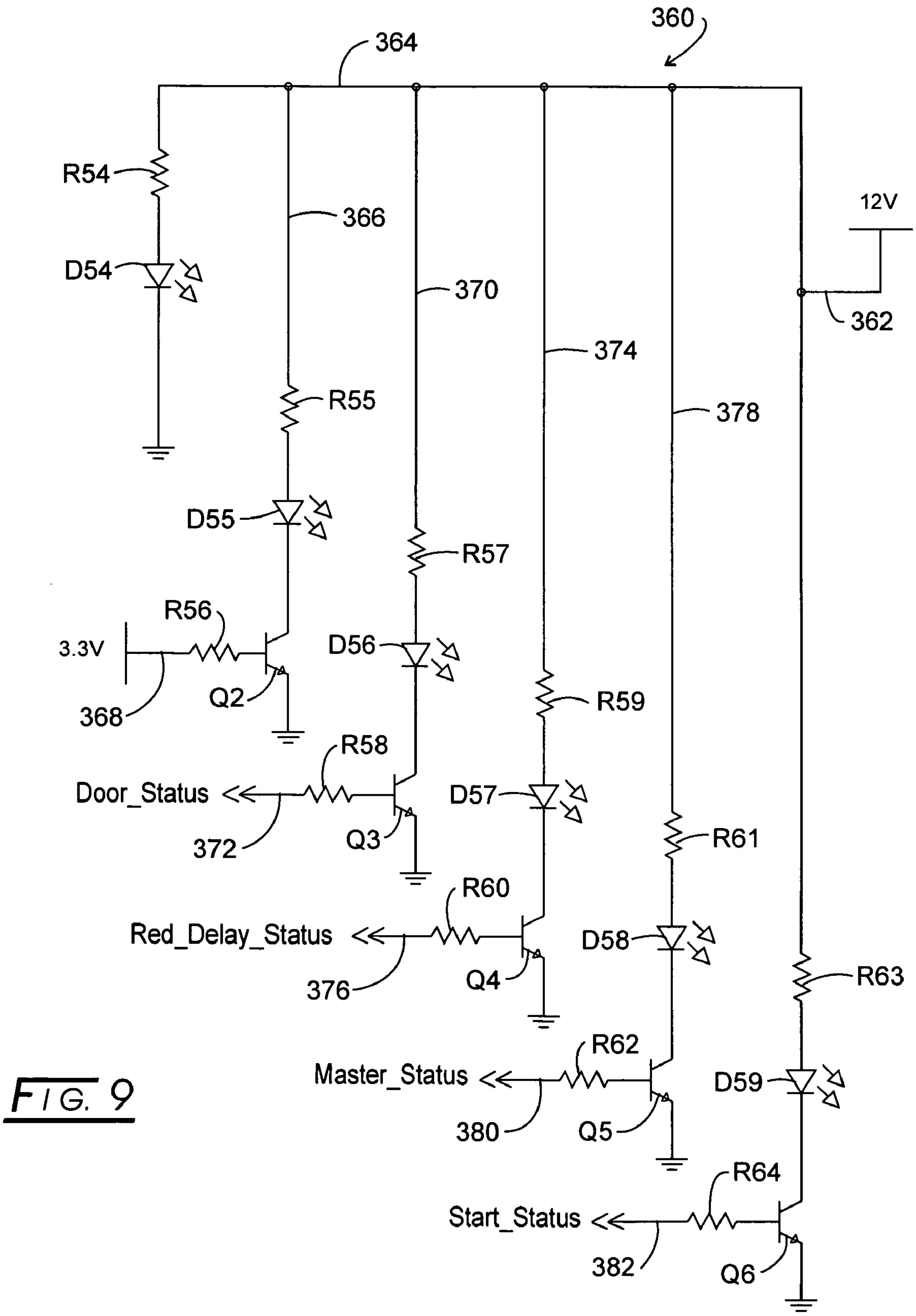
FIG. 9 is an electrical schematic diagram showing LED status indicators which may be employed with the system of the invention.

In the course of developing the instant system it was found to be beneficial to provide some light emitting diode (LED) cues as to the power based operational status of both the power supplies as well as logic-based components. While the light output of these LEDs is blocked subsequent to potting procedures, they can be accessed, for example, by utilizing light pipeing techniques. Looking to FIG. 9, the LED network is represented in general at 360 coupled, as represented at line 362 with 12V power supply. That power supply extends via line 364 to input resistor R54 and associated LED D54. Thus coupled, an illuminated LED D54 indicates the presence of 12V d.c. In similar fashion, line 366 extending from line 364 incorporates resistor R55 and LED D55. LED D55 is illuminated with the turning on of NPN transistor Q2. The base of transistor Q2 is coupled with line 368 incorporating base resistor R56 and is connected, in turn, with 3.3V logic level source.

The status of controls also may be tested. In this regard, as represented at line 370 incorporating resistor R57 and LED D56, door status may be evaluated. In this regard, an NPN transistor Q3 is coupled within line 370, and the base thereof is coupled with line 372 incorporating base resistor R58 and responding to a door status logic input.

Figure 7:
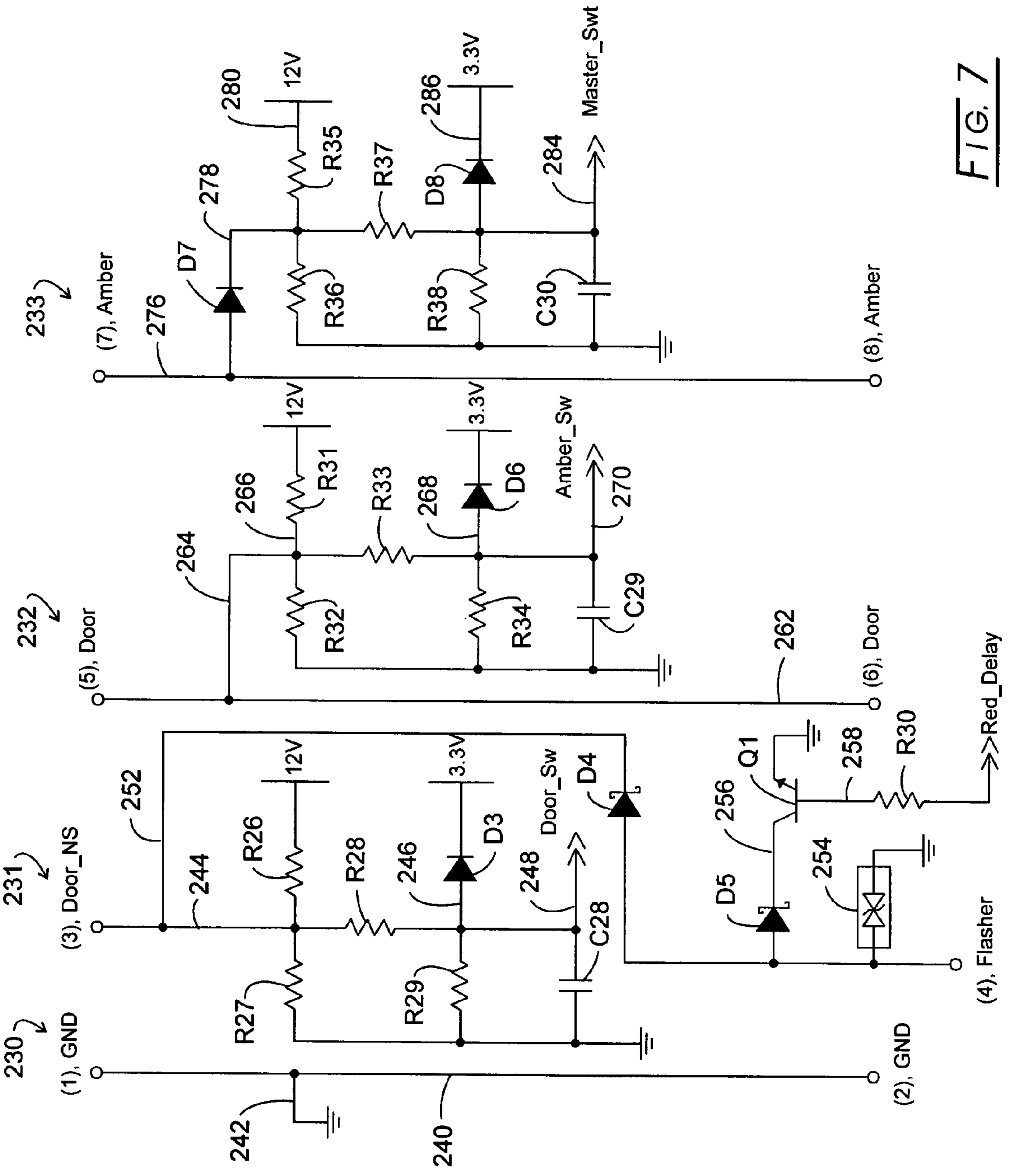
FIG. 7 is an electrical schematic diagram showing networks associated with the blade terminals illustrated in connection with FIG. 3.

Testing of the red delay function as described in FIG. 7 is carried out in conjunction with line 374 incorporating resistor R59 and LED D57. LED D57 is turned on from NPN transistor Q4. The base of transistor Q4 is coupled with line 376 incorporating base resistor R60 responds to a red delay status request. The master status also discussed in connection with FIG. 7 is examined in conjunction with line 378 incorporating resistor R61 and LED D58. LED D58 is turned on from NPN transistor Q5. The base of transistor Q5 is coupled with line 380 incorporating base resistor R62 and responds to a master status input.

Finally, line 354 incorporates resistor R63 and LED D59 to evaluate the start switch status. LED D59 is turned on from NPN transistor Q6. The base of transistor Q6 is coupled with line 382 incorporating base resistor R64. Line 382 responds to a start status inquiry to turn on transistor Q6.

Since certain changes may be made in the above-described method and system without departing from the scope of the invention herein involved, it is intended that all matter contained in the description thereof or shown in the accompanying drawings shall be interpreted as illustrative and not in a limiting sense.

The invention claimed is:

1. In an operator controlled vehicle for carrying passengers having a door actuatable between open and closed orientations for the embarkation and/or disembarkation of passengers at a location, a method for prompt warning such passengers comprising the steps:

approaching such location with the vehicle to define an approach mode;

initiating by said operator the broadcasting of a voice-based aurally discernable approaching message toward said location during said approach mode to provide one or more approach warning prompts to individuals at such location;

stopping said vehicle at said location to define a stop mode;

automatically terminating said approach warning prompt at said stop mode;

actuating said door from said closed to said open orientation at said stop mode;

automatically broadcasting a voice-based aurally discernable loading message toward said location during said stop mode to provide one or more embarkation warning prompts to individuals at such location;

actuating said door from said open to said closed orientation to terminate said stop mode and commence a standby mode;

automatically broadcasting a voice-based aurally discernable departure message toward said location during said standby mode to provide one or more departure warning prompts to individuals at said location; and automatically terminating said standby mode.

2. The method of claim 1 in which:

said approach prompts are broadcast in a repetitive manner during said approach mode.

3. The method of claim 1 further comprising the step:

providing a visibly perceptible approach warning cue during said approach mode; and wherein said approach cue is automatically terminated during said stop mode.

4. The method of claim 3 in which:

said approach cue is terminated in response to said actuation of said door to said open orientation during said stop mode.

5. The method of claim 1 further comprising the step:

providing a visibly perceptible stop warning cue during said stop and standby modes; and wherein said stop cue is automatically terminated at the termination of said standby mode.

6. The method of claim 1 in which:

when said arrival mode has occurred, said standby mode is underway and the operator re-actuates said door from said closed to said open orientation, said departure prompt is automatically terminated.

7. The method of claim 6 in which:

said standby mode is automatically re-entered when the operator re-actuates said door from said closed to said open orientation.

8. The method of claim 1 further comprising the step:

automatically providing a visibly perceptible stop-warning cue during said stop and standby modes and when said operator actuates said door from a closed to an open orientation without initiating the broadcasting of a voice-based aurally discernable approaching message.

9. The method of claim 8 further comprising the step:

automatically terminating said visibly perceptible stop warning cue in the absence of said standby mode.

10. The method of claim 1 in which:

said step broadcasting an aurally discernable loading message during said stop mode is preceded during said stop mode by the automatic broadcasting of a voice-based aurally discernable unloading message to provide one or more debarkation prompts to passengers entering said location from said vehicle.

11. The method of claim 10 in which:

said loading message and said unloading message are broadcast once.

12. The method of claim 1 wherein:

said voice-based aurally discernable approach warning is the recorded voice of one or more persons whose voice characteristics are generally recognizable to the passengers to an extent effective to supplement the function of the immature prefrontal cortex.

13. The method of claim 1 wherein:

said voice-based aurally discernable loading message is the recorded voice of one or more persons whose voice characteristics are generally recognizable to the passengers to an extent effective to supplement the function of the immature prefrontal cortex.

14. The method of claim 1 wherein:

said voice-based aurally discernable departure message is the recorded voice of one or more persons whose voice characteristics are generally recognizable to the passengers to an extent effective to supplement the function of the immature prefrontal cortex.

15. The method of claim 10 wherein:

said voice-based aurally discernable loading message is the recorded voice of one or more persons whose voice characteristics are generally recognizable to the passengers to an extent effective to supplement the function of the immature prefrontal cortex.

16. In an operator controlled vehicle for carrying passengers having a hood, and a door actuatable between open and closed orientations for the embarkation and/or disembarkation of passengers at a location, a prompt warning system comprising:

an external function drive and monitoring assembly operator actuatable to provide a start sequence condition and door open and closed conditions;

a memory assembly controllable to receive, retain and transfer treated recorded human voice prompts recorded by one or more people having voice characteristics generally recognizable by the passengers to an extent effective to supplement the function of the immature prefrontal cortex;

a decoding assembly controllable to receive said treated recorded human voice prompts and convert them to analog human voice signals;

an amplifier assembly responsive to said analog human voice signals to derive amplified analog human voice signals;

a broadcaster responsive to said analog human voice signals to derive corresponding human voice messages aurally discernable at said location;

a digital control assembly, responsive to said start sequence condition and door open and closed conditions to control said memory and said decoding assembly to transfer said treated recorded human voice prompts from said memory to said decoding assembly and effect said conversion to analog human voice signals;

said digital control assembly being responsive to said start sequence condition to establish an approach mode controlling said memory to effect transfer of one or more approach message designated treated recorded human voice prompts to said decoding assembly and effect the conversion thereof to one or more approach message designated analog human voice signals;

said digital control assembly, when in said approach mode further being responsive to a door open condition to establish a stop mode controlling said memory to effect transfer of one or more embarkation and/or disembarkation designated treated recorded human voice prompts to said decoding assembly and effect the conversion thereof to one or more embarkation and/or disembarkation designated analog human voice signals; and said digital control assembly, when in said stop mode further being responsive to a door closed condition to establish a standby mode controlling said memory to effect transfer of one or more departure designated treated recorded human voice prompts to said decoding assembly and effect the conversion thereof to one or more departure designated analog human voice signals.

17. The system of claim 16 in which:

said memory retained treated human voice prompts are digitized A-law compressed data; and said decoder assembly is controllable to expand and convert said data into said analog human voice signals.

18. The system of claim 16 further comprising:

an input/output port coupled with said digital control assembly operable for conveying said treated recorded human voice prompts thereto.

19. The system of claim 16 in which:

said digital control assembly is responsive in the presence of said transition to a door open condition, to a door closed condition, to re-enter said standby mode.

20. The system of claim 16 further comprising:

a stop assembly controllable to provide a visibly perceptible stop-warning cue mounted upon said vehicle; and said digital control assembly is responsive, in the absence of said start sequence condition, to said transition from said door closed condition to control said stop assembly to provide said visibly perceptible stop warning cue.

21. The system of claim 16 further comprising:

said broadcaster is mounted under said hood at a location adjacent said door effective to provide said human voice messages which are aurally discernable by humans at said location.

22. The system of claim 16 in which:

said digital control assembly is responsive, in the absence of said start sequence condition, to a transition from said door closed condition to said door open condition to provide no control to said memory assembly nor said decoding assembly.

* * * * *